(12) United States Patent
Jackowski et al.

(10) Patent No.: US 10,704,570 B2
(45) Date of Patent: *Jul. 7, 2020

(54) HYDRAULIC PRESSURE VARIATION IN A LEGGED ROBOT

(71) Applicant: Boston Dynamics, Inc., Waltham, MA (US)

(72) Inventors: Zachary John Jackowski, Somerville, MA (US); Alex Yu Khripin, Waltham, MA (US); Alfred Anthony Rizzi, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/176,500

(22) Filed: Oct. 31, 2018

(65) Prior Publication Data

US 2019/0063468 A1 Feb. 28, 2019

Related U.S. Application Data

(63) Continuation of application No. 15/493,462, filed on Apr. 21, 2017, now Pat. No. 10,145,392, which is a (Continued)

(51) Int. Cl.
*B25J 9/14* (2006.01)
*F15B 11/20* (2006.01)
(Continued)

(52) U.S. Cl.
CPC .............. *F15B 11/20* (2013.01); *B25J 9/144* (2013.01); *B62D 57/032* (2013.01); *F15B 1/024* (2013.01);
(Continued)

(58) Field of Classification Search
None
See application file for complete search history.

(56) References Cited

U.S. PATENT DOCUMENTS 7,308,848 B2 12/2007 Jacobsen et al.
7,498,758 B2 3/2009 Baba et al.
(Continued)

OTHER PUBLICATIONS

Hofmann, Andreas, "Robust Execution of Bipedal Walking Tasks From Biomechanical Principles," Computer Science and Artificial Intelligence Laboratory Technical Report, Massachusetts Institute of Technology, Cambridge, MA, dated Apr. 4, 2006, 407 pages.

*Primary Examiner* — Timothy R Waggoner
(74) *Attorney, Agent, or Firm* — Honigman LLP; Brett A. Krueger

(57) ABSTRACT

An example robot includes movable members, a hydraulic system including at least (i) hydraulic actuators configured to operate the movable members, and (ii) a source of hydraulic fluid, and a controller. The controller may be configured to: determine a task to be performed by the robot, where the task includes a plurality of phases; cause hydraulic fluid having a first pressure level to flow from the source to the hydraulic actuators for the robot to perform a first phase of the plurality of phases of the task; based on a second phase of the task, determine a second pressure level for the hydraulic fluid; and adjust, based on the second pressure level, operation of the hydraulic system before the robot begins the second phase of the task.

21 Claims, 9 Drawing Sheets

Related U.S. Application Data continuation of application No. 14/865,223, filed on Sep. 25, 2015, now Pat. No. 9,662,787.

(51) Int. Cl.
  *B62D 57/032* (2006.01)
  *F15B 1/02* (2006.01)

(52) U.S. Cl.
  CPC ............... *F15B 2211/205* (2013.01); *F15B 2211/20515* (2013.01); *F15B 2211/20538* (2013.01); *F15B 2211/212* (2013.01); *F15B 2211/265* (2013.01); *F15B 2211/55* (2013.01); *F15B 2211/6309* (2013.01); *F15B 2211/6651* (2013.01); *F15B 2211/6653* (2013.01); *F15B 2211/7053* (2013.01); *F15B 2211/7142* (2013.01); *F15B 2211/78* (2013.01); *F15B 2211/86* (2013.01); *Y10S 901/01* (2013.01); *Y10S 901/02* (2013.01); *Y10S 901/09* (2013.01)

(56) References Cited

U.S. PATENT DOCUMENTS

| | | | |
|---|---|---|---|
| 7,942,221 | B1 | 5/2011 | Tilden |
| 8,126,592 | B2 | 2/2012 | Saunders et al. |
| 8,516,918 | B2 | 8/2013 | Jacobsen et al. |
| 8,731,716 | B2 | 5/2014 | Jacobsen et al. |
| 9,283,949 | B2 | 3/2016 | Saunders et al. |
| 9,662,787 | B1 * | 5/2017 | Jackowski ............... B25J 9/144 |
| 2005/0121283 | A1 | 6/2005 | Brissenden et al. |
| 2010/0090638 | A1 | 4/2010 | Saunders et al. |
| 2011/0231050 | A1 | 9/2011 | Goulding |
| 2012/0291873 | A1 | 11/2012 | Potter et al. |
| 2013/0280097 | A1 * | 10/2013 | Narotham ............... F04B 49/00 417/1 |
| 2015/0325065 | A1 * | 11/2015 | Foster .................. G07C 5/0825 701/50 |
| 2016/0023699 | A1 | 1/2016 | Saunders et al. |

\* cited by examiner

HYDRAULIC PRESSURE VARIATION IN A LEGGED ROBOT

CROSS REFERENCE TO RELATED APPLICATION

This application is a continuation of, and claims priority under 35 U.S.C. § 120 from, U.S. patent application Ser. No. 15/493,462, filed on Apr. 21, 2017, which is a continuation of U.S. patent application Ser. No. 14/865,223, filed on Sep. 25, 2015, The disclosures of these prior applications are incorporated herein by reference in their entireties.

BACKGROUND

An example robot may have a plurality of members composing the robot's legs and arms. The robot may be configured to perform tasks that involve walking, running, standing in position, grasping objects, etc. To perform these tasks, a controller of the robot may actuate one or more of the members of the robot. For instance, controller may actuate the legs so as to cause the robot to take steps toward a particular location. The robot may include a hydraulic system configured to provide hydraulic power to actuate the members of the robot.

SUMMARY

The present disclosure describes implementations that relate to hydraulic pressure variation in a legged robot. In a first example implementation, the present disclosure describes a robot. The robot includes one or more movable members. The robot also includes a hydraulic system comprising at least (i) one or more hydraulic actuators configured to operate the one or more movable members, and (ii) a source of hydraulic fluid. The robot further includes a controller configured to perform operations. The operations include determining a task to be performed by the robot. The task includes a plurality of phases. The operations also include causing hydraulic fluid having a first pressure level to flow from the source to the one or more hydraulic actuators for the robot to perform a first phase of the plurality of phases of the task. The operations further include, based on a second phase of the task, determining a second pressure level for the hydraulic fluid. The operations also include adjusting, based on the second pressure level, operation of the hydraulic system before the robot begins the second phase of the task.

In a second example implementation, the present disclosure describes performing the following operations: (i) determining a task to be performed by a robot, where the robot includes one or more movable members and a hydraulic system comprising at least (a) one or more hydraulic actuators configured to operate the one or more movable members, and (b) a source of hydraulic fluid, where the task includes a plurality of phases; (ii) causing hydraulic fluid having a first pressure level to flow from the source to the one or more hydraulic actuators for the robot to perform a first phase of the plurality of phases of the task; (iii) based on a second phase of the task, determining a second pressure level for the hydraulic fluid; and (iv) adjusting, based on the second pressure level, operation of the hydraulic system before the robot begins the second phase of the task.

In a third example implementation, the present disclosure describes a non-transitory computer readable medium having stored therein instructions that, when executed by a computing device, cause the computing device to perform operations in accordance with the second example implementation.

A fourth example implementation may include a system having means for performing operations in accordance with the second example implementation The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

The following detailed description describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Example Robotic Systems

Figure 1:
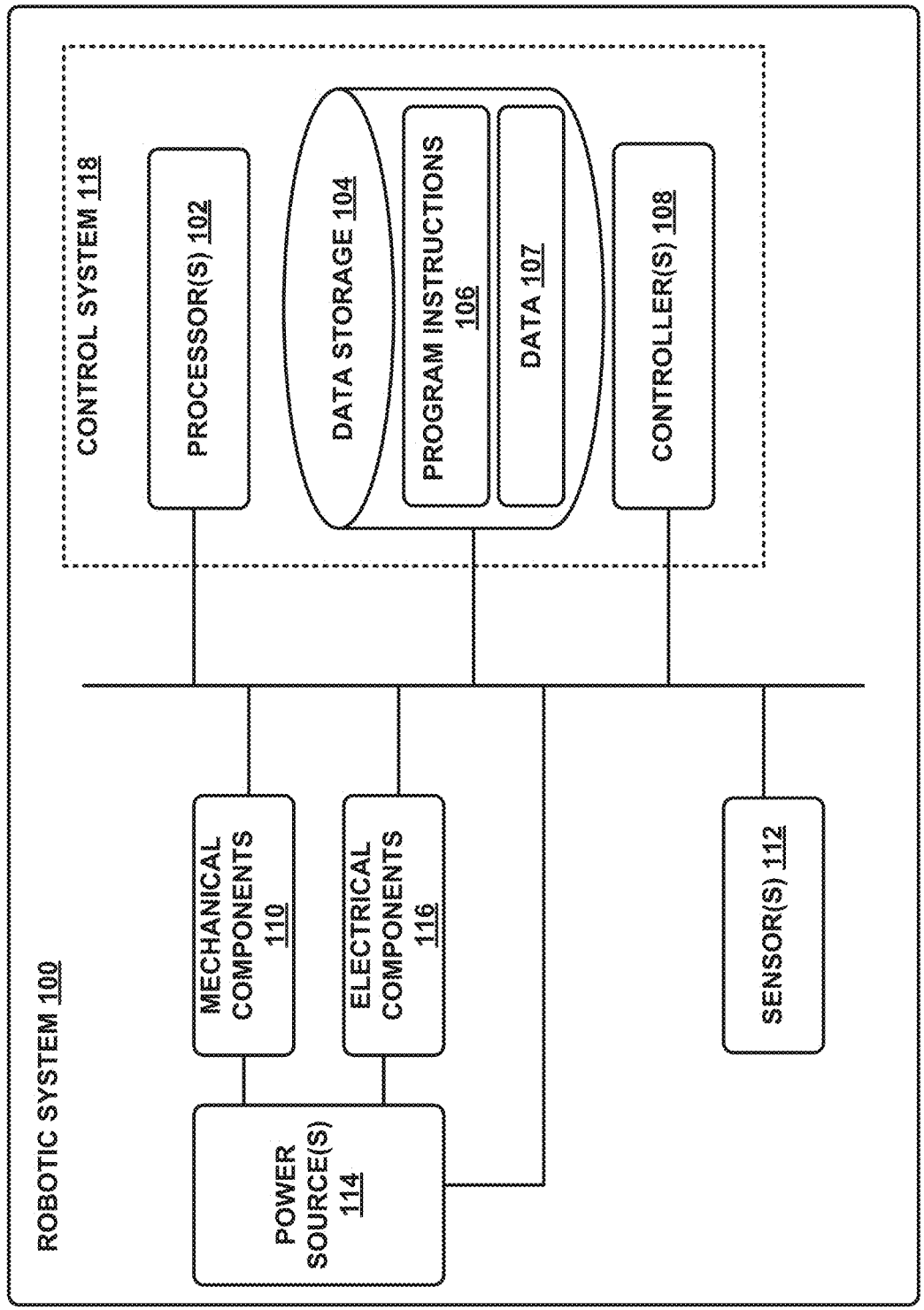
FIG. 1 illustrates an example configuration of a robotic system, in accordance with an example implementation.

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement.

Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic system 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic system 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic system 100, such as on the body and/or on one or more of the appendages, among other examples.

On its body, the robotic system 100 may carry a load, such as a type of cargo that is to be transported. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
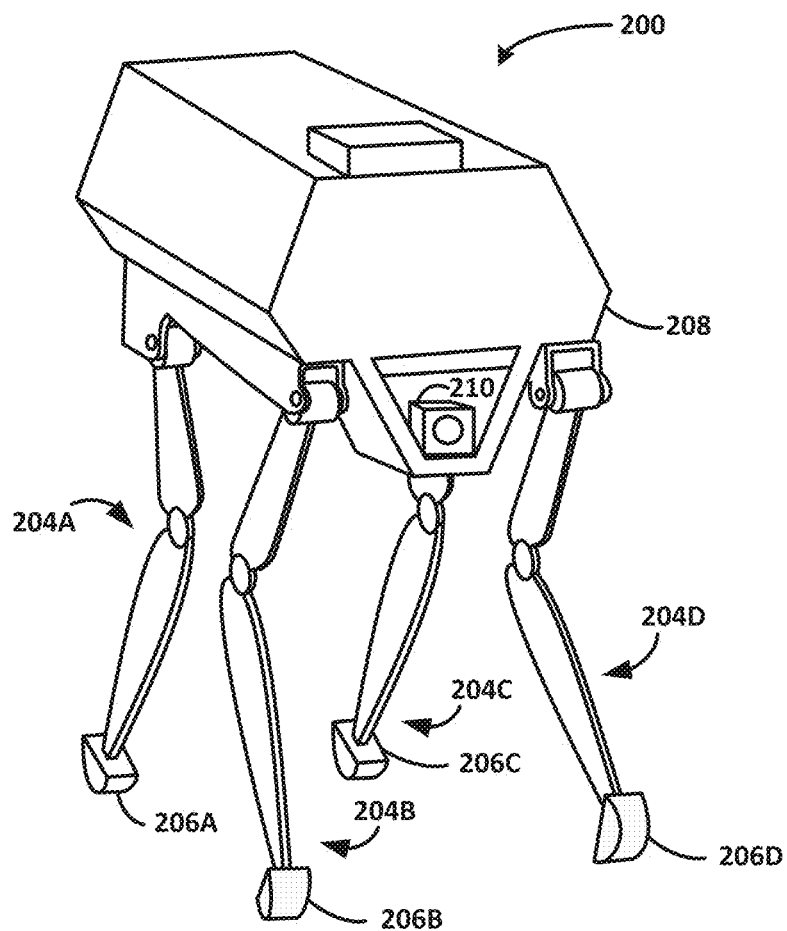
FIG. 2 illustrates a quadruped robot, in accordance with an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
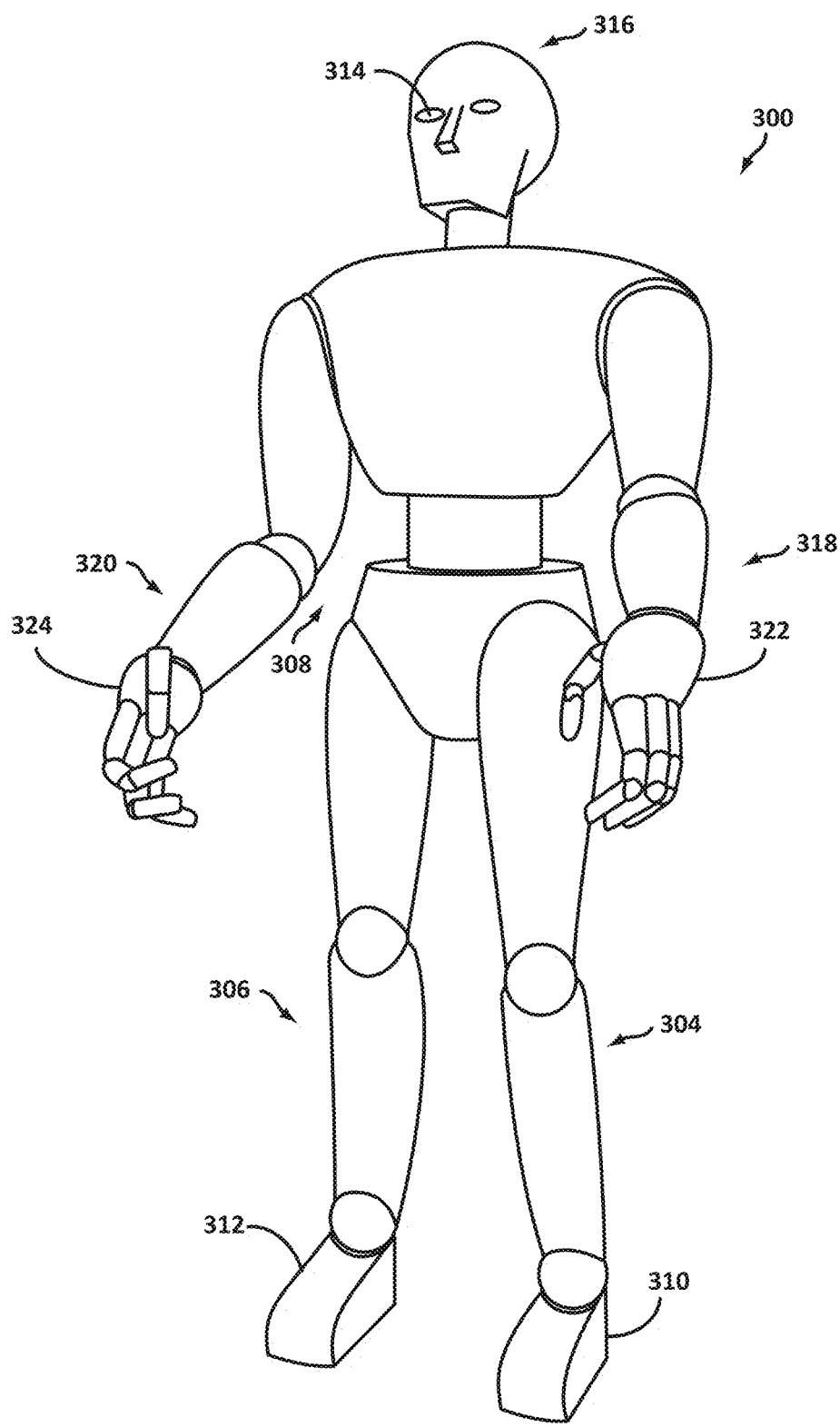
FIG. 3 illustrates a biped robot, in accordance with another example implementation.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 (or end-effectors) for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

II. Controlling Hydraulic Pressure Level in a Legged Robot

In examples, a legged robot, such as any of the robots 200 and 300, may include a hydraulic system configured to control movement of various members of the robot. An example hydraulic system may include multiple actuators (e.g., hydraulic cylinders, rotary vane-actuators, hydraulic motors, etc.). In some examples, the hydraulic system may have a single pressure source driving the actuators. Such a hydraulic system may be referred to as a "single pressure rail" system. In a single pressure rail system, a hydraulic pump, or any pressure source, may maintain a source of supply pressure, and multiple valves may be used to control flow to the actuators.

For the legged robot to perform a particular task, such as walking or trotting, the actuators require fluid from the pump at a particular pressure so as to cause the respective members of the robot to move. However, during a task or a phase of a task, each actuator may exert or may be subjected to a different force compared to other actuators, and thus may require a different hydraulic pressure compared to other actuators. For instance, during a particular operation, a first actuator may exert negative work (e.g., perform a movement assisted by gravity), while a second actuator may exert a positive work (e.g., push against the ground). In this case, the first actuator may require less, if any, system pressure compared to the second actuator. However, the pump should still provide hydraulic fluid at a pressure sufficient to drive the second actuator, i.e., the pump should provide fluid at the higher requested pressure.

In examples, a controller of the robot may be configured to control the pressure source to supply fluid at a constant high pressure that is sufficient to drive any of the actuators during any task. However, in these examples, the robot may operate inefficiently because the constant high pressure would be determined based on the highest expected pressure regardless of the current task or anticipated behavior of the robot. For such a robot, improving hydraulic efficiency can reduce energy consumption, which may result in reduction in weight of fuel, weight of batteries, and/or cost. Disclosed herein are systems and operations for varying hydraulic fluid pressure to provide a pressure sufficient to perform a desired task based on a current state of the robot, anticipated future behavior of the robot, and any anticipated disturbance to the robot.

Figure 4:
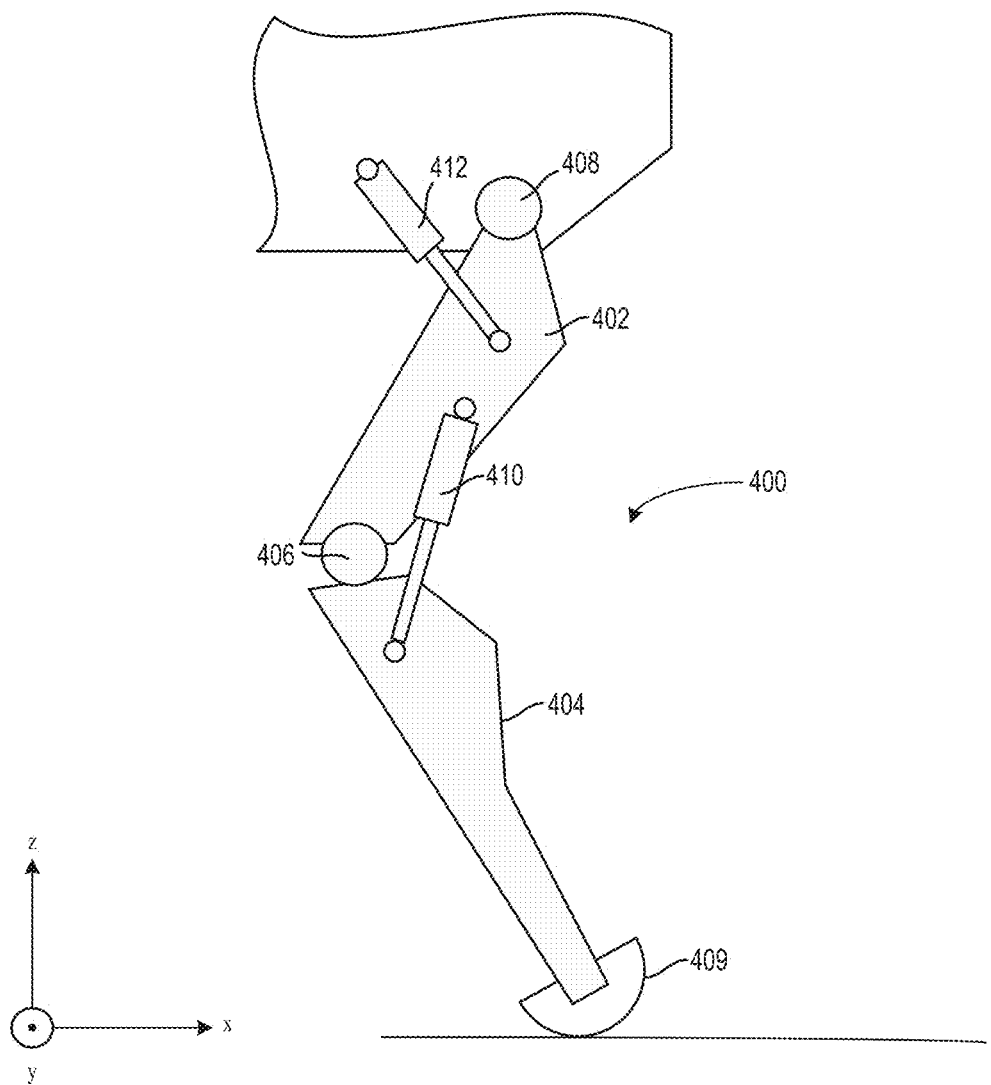
FIG. 4 illustrates a side view of a robotic leg, in accordance with an example implementation.

FIG. 4 is a side-view of an example articulable robotic leg 400, in accordance with an example implementation. The robotic leg 400 includes a member 402 and a member 404. The member 402 has an outboard end that is connected in a rotatable manner to an inboard end of the member 404 at a joint 406. The member 402 has an inboard end that is connected to the robot at joint 408. The member 404 has an outboard end that is connected to a foot member 409. The foot member 409 is depicted in FIG. 4 to be similar to the feet 206A-206D of the robot 200. However, this description applies to other types of feet such as the feet 310 and 312 of the robot 300.

The robotic leg 400 also includes an actuator 410 connected between the member 402 and the member 404. The robotic leg 400 further includes an actuator 412 connected between the member 402 and the robot. In some implementations, the actuators 410 and 412 may be linear hydraulic actuator cylinders. Operating the actuator 412 causes the member 402 and the member 404 to rotate around joint 408. Similarly, actuation of the actuator 410 causes the member 404 to rotate around the joint 406.

Operating the actuator 410 and the actuator 412 in combination may cause the leg 400 to take a step. For instance, the actuator 410 may retract, which causes member 404 to rotate counter-clockwise (from the perspective shown in FIG. 4) around the joint 406. This rotation may raise the leg 400 up from the ground. The actuator 412 may retract, which causes the member 402 to rotate clockwise (from the perspective shown in FIG. 4) around the joint 408. By rotating the member 402 clockwise around the joint 408, the foot member 409 moves forward relative to the ground. The actuators 410 and 412 may then extend and cause the robotic leg 400 to be lowered and push against the ground, causing the robot to move forward or to adopt a new stance.

Although the side view of the robotic leg in FIG. 4 is shown with the two actuators 410 and 412 that move the robotic leg 400 in two dimensions, the robotic leg 400 may have any number of actuators that allow for more or fewer degrees of freedom. In some cases, the robotic leg 400 may include actuators that allow for lateral movement of the robotic leg 400 (i.e., in and out of the page in the y-direction) in addition to longitudinal movement (i.e., in the x-direction depicted in FIG. 4) and vertical movement (i.e., in the z-direction depicted in FIG. 4).

A task to be performed by the robot may include a plurality of phases. For example, a task may include a first phase that includes picking up an object, followed by a second phases that involves walking for a particular period of time. A third phase of the task may involve trotting or jogging to another location, followed by a fourth phase that involves stopping at a target location, and followed by a fifth phase that involves placing the object on a shelf or inserting the object in a hole, etc.

To perform a particular task that includes a plurality of phases, the robot may move according to different gaits by varying the timing of actuation, speed of actuation, and range of actuation of the actuators. The control system of the robot may select a particular gait based on factors such as the phase of task to be performed, speed, terrain, the need to maneuver, etc. For instance, in a particular task, the robot may transition from a walk to a run as speed of locomotion is increased. The robot may then transition back to a walk on uneven terrain.

Further, load on the hydraulic actuators may vary during the stepping sequence. During the portion of the gait in which the hydraulic actuators are causing a leg to push against the ground, the load on the hydraulic actuators is relatively large compared to the portion of the gait in which the hydraulic actuators are raising the leg and stepping forward. As the load varies, the robot may vary the hydraulic pressure to maintain the movement of the legs according to the gait. Also, acceleration of hydraulic actuators (i.e., acceleration of a piston of a linear hydraulic actuator cylinder) is proportional to the pressure of the hydraulic fluid used to actuate the hydraulic actuator. Thus, the hydraulic system should supply hydraulic fluid at a pressure level that is sufficient to enable the robot to meet performance requirements of a particular task or a phase of a task. Described next is an example system that enables varying the supply pressure level during performance of the task such that the robot is capable of performing the task, while operating efficiently.

Figure 5:
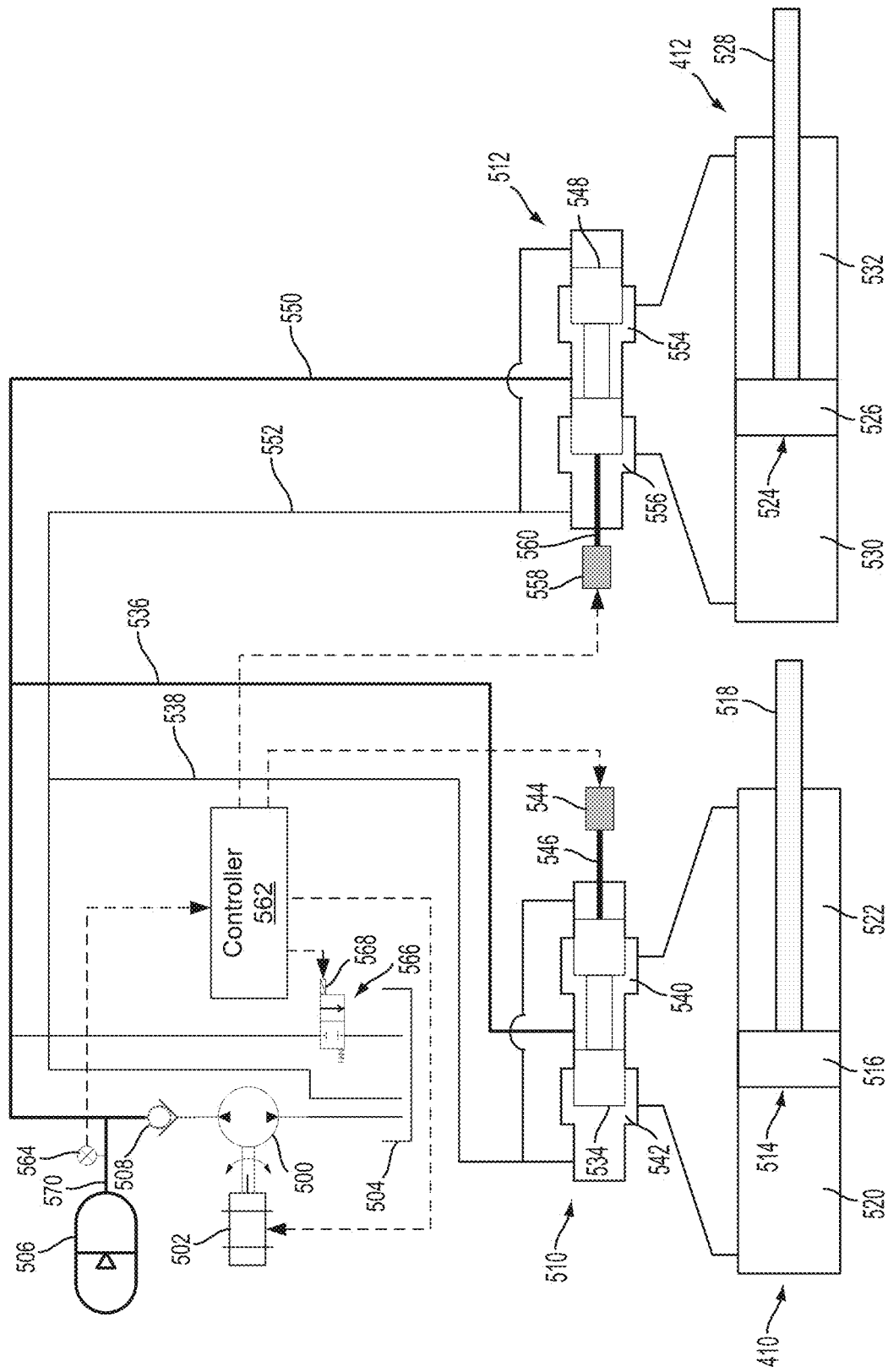
FIG. 5 illustrates a hydraulic system controlling actuators and of a robotic leg, in accordance with an example implementation.

FIG. 5 illustrates a hydraulic system controlling the actuators 410 and 412 of the robotic leg 400, in accordance with an example implementation. The actuators 410 and 412 are illustrated as linear hydraulic actuator cylinders. However, the hydraulic system described herein can be used to control other types of hydraulic actuators as well (e.g., hydraulic motors).

FIG. 5 illustrates a hydraulic pump 500 driven by a motor 502. The pump 500 has access to hydraulic fluid from a reservoir 504 and provides pressurized fluid to an accumulator 506 through check valve 508. The check valve 508 precludes backflow into the pump 500 to protect the pump 500. Hydraulic valves such as valves 510 and 512 control flow of hydraulic fluid from the accumulator 506 to the hydraulic actuators 410 and 412, respectively, and control flow of fluid discharged from the hydraulic actuators 410 and 412 to the reservoir 504.

The actuator 410 includes a piston 514 slidably accommodated in the actuator 410. The piston 514 includes a piston head 516 and a rod 518 extending from the piston head 516 along a central axis direction of the actuator 410. The rod 518 is thus coupled to the member 404 shown in FIG. 4. The piston head 516 divides the inside of the actuator 410 into two chambers, 520 and 522. Similarly, the actuator 412 includes a piston 524 slidably accommodated in the actuator 412. The piston 524 includes a piston head 526 and a rod 528 extending from the piston head 526 along a central axis direction of the actuator 412. The rod 528 is thus coupled to the member 402. The piston head 524 divides the inside of the actuator 412 into two chambers, 530 and 532. Although the actuators 410 and 412 are depicted as double-acting cylinders, single acting cylinders and other configurations of actuators are contemplated.

The valve 510 has a spool 534 configured to move linearly within a body of the valve 510. The valve 510 is configured to control hydraulic fluid flow to and from the actuator 410 so as to control motion of the piston 516. Particularly, axial position of the spool 534 controls flow from the accumulator 506 through a supply line 536 to one of the two chambers 520 and 522 of the actuator 410. Axial position of the spool 534 further controls flow of fluid forced out from the other chamber to the reservoir 504 by way of return line 538. For instance, the spool 534 may be shifted to a given linear position to the right of a null position of the spool 534 as shown in FIG. 5. At this position, fluid flows from the accumulator 506 through opening 540 to the chamber 522, and fluid is forced out from the chamber 520 through opening 542 to flow through the return line 538 to the reservoir 504. As a result, the piston 516 retracts (i.e., moves left in FIG. 5). Alternatively, the spool 534 may be shifted to a linear position to the left of the null position. At such a position, fluid flows from the accumulator 506 through the opening 542 to the chamber 520, and fluid is forced out from the chamber 522 through the opening 540 to flow through the return line 538 to the reservoir 504. As a result, the piston 516 extends (i.e., moves right in FIG. 5).

An electric solenoid, a stepper motor, a hydraulic actuator, or any other actuation device may be used for moving the spool 534. For example, as shown as an example for illustration in FIG. 5, a solenoid 544 is coupled to a rod 546, which in turn is coupled to the spool 534. Thus, actuating the solenoid 544 by an electric signal causes the rod 546 and the spool 534 to move linearly within the body of the valve 510.

Similarly, the valve 512 has a spool 548 configured to move linearly within a body of the valve 512. The valve 512 is configured to control hydraulic fluid flow to and from the actuator 412 so as to control motion of the piston 524. Particularly, axial position of the spool 548 controls flow from the accumulator 506 through a supply line 550 to one of the two chambers 530 and 532 of the actuator 412. Axial position of the spool 548 controls further controls flow of fluid forced out from the other chamber to the reservoir 504 by way of return line 552. For instance, as shown in FIG. 5, the spool 548 is shifted to a given linear position to the right of a null position of the spool 548. At this position, fluid flows from the accumulator 506 through opening 554 to the chamber 532, and fluid is forced out from the chamber 530 through opening 556 to flow through the return line 552 to the reservoir 504. As a result, the piston 524 retracts (i.e., moves left in FIG. 5). A solenoid 558 is coupled to a rod 560, which in turn is coupled to the spool 548. Thus, actuating the solenoid 558 by an electric signal causes the rod 560 and the spool 548 to move linearly within the body of the valve 512. The piston 524 can be extended by changing the position of the spool 548 within the body of the valve 512.

Although the valves 510 and 512 are depicted as four-way spool valves, any other type of valves could be used to control flow of fluid to and from the actuators. For example, a rotary valve having a spool rotating inside a sleeve could be used. In another example, four two-way valves (e.g., poppet valves) could replace each of the valves 510 and 512. Thus, different valve types of combination of valves could be used instead of the four-way spool valves 510 and 512.

A controller 562 of the robot is configured to cause the robot to perform a particular task. The controller 562 may receive input information indicative of a task to be performed (e.g., a trajectory or a path to be followed), or may determine the task to be performed based on other inputs. The task may be composed of various phases. For instance, the task may involve standing for a period of time, followed by trotting for another period of time, and then followed by jogging for another period of time.

During operation of the robot, the actuators 410 and 412 require hydraulic fluid at a particular pressure to move the respective members of the robot. One actuator may require fluid at a pressure different from the pressure required by the other actuator. The controller 562 may be configured to control the hydraulic system shown in FIG. 5 so as to provide the higher pressure. The description provided herein uses the two actuators 410 and 412 for illustration only. However, it should be understood that the robot may have more actuators. For example, assuming the robot has four legs, each leg having at least two actuators, the robot may have at least eight actuators. The controller 562 may receive information, e.g., via pressure or force sensors, or based on the task, indicative of a pressure level appropriate for each of the eight actuators. The controller 562 may then operate the hydraulic system to provide the fluid at the highest of the eight pressure levels.

As mentioned above, in an example, the controller 562 may command the hydraulic system to maintain fluid at a sufficiently high pressure to drive the actuators in all expected scenarios. In this example, however, the hydraulic system may operate inefficiently. Particularly, the hydraulic system consumes power based on supply fluid pressure, i.e., the pressure of hydraulic fluid stored in the accumulator 506. The consumed power is calculated as≅P×Q, where P is the pressure of fluid provided by the accumulator 506 and Q is the flow rate of hydraulic fluid flowing to the actuators 410 and 412 through the valves 510 and 512.

The pressure P may be determined to be sufficiently high to allow the actuators 410 and 412 to exert the maximum anticipated force. In this case, the pressure P is determined to be equal to $$\frac{F_{max}}{A},$$

where $F_{max}$ is the maximum force that one or more of the actuators 410 and 412 are anticipated to exert, and A is a cross section area of a piston of the actuator (e.g., the piston 514 or the piston 524). In this example, in instances during operation of the robot where the actuators 410 and 412 are not required to exert the maximum force, the hydraulic system still provides the fluid at the pressure P. The difference between P and the actual required pressure at a given instant is dissipated as a hydraulic loss through hydraulic components, such as the valves 510 and 512 and the hydraulic lines, rendering the hydraulic system inefficient. To render the system more efficient, the controller 562 may be configured to control the hydraulic system to vary the supply pressure level based on environmental conditions and the task of the robot as described next.

The controller 562 may receive pressure sensor information from a sensor 564 at an outlet of the accumulator 506. If the pressure at the outlet of the accumulator 506 is less than the required pressure, the controller 562 provides a signal to the motor 502 to rotate and cause the pump 500 to provide high pressure fluid to the accumulator 506. The pump 500 may continue to provide fluid to the accumulator 506 until the pressure in the accumulator 506 exceeds the required pressure by a margin (i.e., by a threshold pressure value).

Although FIG. 5 depicts a hydraulic system having a constant displacement pump 500 driving by a variable speed motor 502, other pump-motor configurations are contemplated. For example, instead of a constant displacement pump, a variable displacement pump may be used. Such a variable displacement pump may have swash plate, the angle of which determines an amount of flow discharged from the pump. The controller 562 may vary an angle of the swash plate to vary the amount of flow discharged from the pump even if a speed of the motor 502 remains the same.

Thus, different pump-motor configurations could be used to control pressure level in the accumulator 506.

If the pressure at the outlet of the accumulator 506 is higher than the required pressure, the controller 562 may stop or slow down the motor 502 if the motor 502 were running. In this manner, as the accumulator 506 provides fluid to the actuators 410 and 412, the controller 562 allows pressure at the outlet of the accumulator 506 to be reduced. Pressure is reduced by not allowing the pump 500 to make up for the fluid discharged from the accumulator 506.

Thus, reduction in pressure takes place as the accumulator 506 provides fluid to the actuators, or, if the actuators are not consuming hydraulic fluid, reduction in pressure may occur as a result of leakage of hydraulic fluid throughout the hydraulic system. The controller 562 may allow such reduction in pressure as long as a target pressure value (i.e., the requested pressure plus a pressure margin value) is lower than the pressure at the outlet of the accumulator 506.

Further, the hydraulic system may include a dump valve 566 that is electrically actuatable by the controller 562 to dump fluid from the accumulator 506 to the reservoir 504. The dump valve 566 is shown as a two-way valve that blocks flow from the accumulator 506 to the reservoir 504 until the controller 562 provides an actuation signal to a solenoid 568. If the controller 562 provides a signal to actuate the dump valve 566, flow is allowed between the accumulator 506 and the reservoir 504, thus reducing hydraulic pressure of fluid in the accumulator 506. When the sensor 564 indicates to the controller 562 that a target pressure value has been reached, the controller 562 deactivates the dump valve 566 to block the flow between the accumulator 506 and the reservoir 504. The dump valve 566 can be any type of spool valve, poppet valve, rotary valve, etc. Further, in some examples, the dump valve 566 may be connected between the accumulator 506 and any other point, other than the reservoir 504, in the hydraulic system having lower pressure than the accumulator 506.

In examples, the controller 562 may implement closed loop control techniques to cause the pressure at the outlet of the accumulator 506 to reach a target pressure value. In these examples, the input to the controller 562 may include sensor information from the sensor 564, and the outputs may include commands to the motor 502, the valves 510 and 512, and the dump valve 566. The controller 562 thus actuates the components of the hydraulic system illustrated in FIG. 5 so as to reduce an error or discrepancy between a target pressure value and the actual pressure value at of fluid in the accumulator 506.

The hydraulic system in FIG. 5 may include more or less components than depicted in FIG. 5. Further, hydraulic lines depicted in FIG. 5 may represent multiple hydraulic lines. For instance, hydraulic line 570 may represent at least two hydraulic lines. A first hydraulic line may be configured to communicate fluid from the pump 500 to the accumulator 506, and a second hydraulic line may be configured to communicate fluid from the accumulator 506 to the rest of the hydraulic system.

Figure 6:
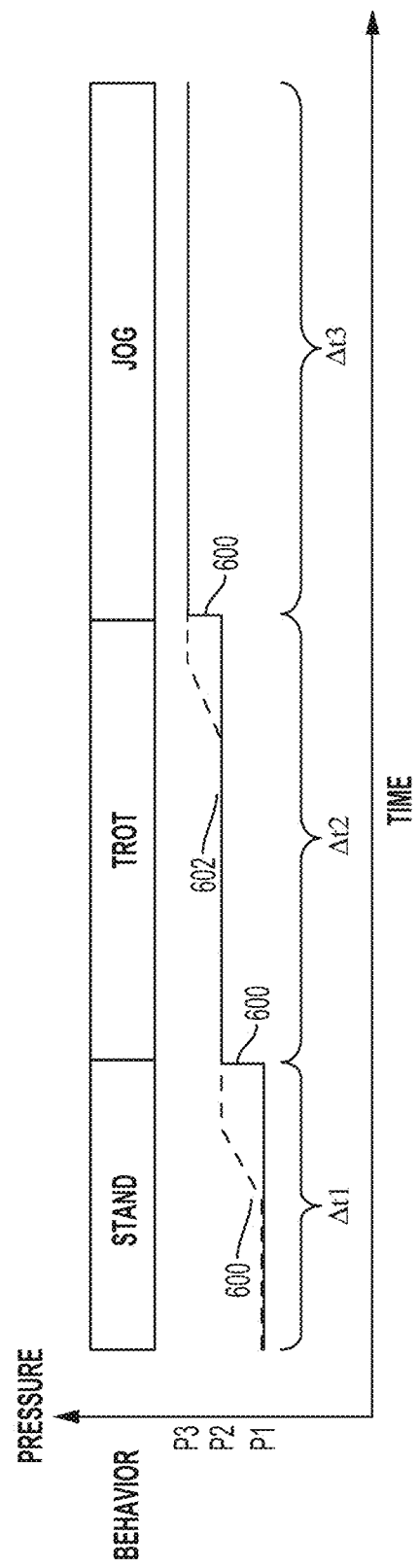
FIG. 6 illustrates pressure variation during a task having a plurality of phases, in accordance with an example implementation.

To control the robot efficiently while performing a task, the controller 562 may take into consideration a current state of the robot and an anticipated behavior of the robot in the near future. As an example for illustration, FIG. 6 illustrates pressure variation during a task having a plurality of phases, in accordance with an example implementation. The task includes the robot standing for a period of time $\Delta t1$, then trotting for a period of time $\Delta t2$, and then jogging for a period of time $\Delta t3$. While the robot is standing, pressure required by the actuators 410 and 412 is assumed to be P1.

While the robot is trotting, pressure required by the actuators 410 and 412 is assumed to be P2, which is higher than P1 because the leg 400 of the robot may exert or may be subjected to higher forces during trotting than during standing. Similarly, while the robot is jogging, pressure required by the actuators 410 and 412 is assumed to be P3, which is higher than P2 because the leg 400 of the robot may exert or may be subjected to higher forces during jogging than during trotting. The pressures P1, P2, and P3 are assumed to be sufficiently high to meet the higher of the two respective pressures required by the actuators 410 and 412 in addition to a margin pressure to compensate for any hydraulic losses.

If the controller 562 takes into consideration or reacts to just the current state of the robot, the controller 562 may cause the hydraulic system to maintain P1 for a period of $\Delta t1$ (duration of standing). Then, after $\Delta t1$ elapses, the robot starts to trot and the controller 562 reacts by commanding the motor 506 to operate the pump 500 to pump fluid into the accumulator 506 until the accumulator 506 can provide fluid having pressure P2 appropriate for the trotting phase. The controller 562 may cause the hydraulic system to maintain P2 for a period of $\Delta t2$ (duration of trotting). Then, after $\Delta t2$ elapses, the robot starts jogging and the controller 562 reacts by commanding the motor 502 to operate the pump 500 and pump fluid into the accumulator 506 until the accumulator 506 can provide fluid having pressure P3. Such pressure variation based on a current state of the robot is illustrated by line 600. As shown by the line 600, pressure changes from P1, to P2, to P3 are abrupt, which may result in some jerkiness in the motion of the robot. The transitions from P1, to P2, to P3 are depicted by the line 600 as vertical sharp transition, but in practice, such transitions may be performed over a short period of time based on dynamic response capabilities of the system.

In another example, to improve efficiency and performance of the robot, the controller 562 may take into consideration the current state of the robot and the anticipated state of the robot as shown by line 602. Particularly, before $\Delta t1$ has elapsed, the controller 562, in anticipation of transition from standing to trotting, may cause the motor 502 to start actuating the pump 500 to ramp up pressure level to P2 over a period of time. Similarly, before $\Delta t2$ has elapsed, the controller 562, in anticipation of transition from trotting to jogging, may cause the motor 502 to start actuating the pump 500 to ramp up pressure level to P3. Ramping up pressure level from P2 to P3 may take place over a period of time. In this manner, the controller 562 varies the pressure level smoothly in anticipation of changes in pressure requirements during performance of a given task.

In addition to the current and anticipated states of the robot, the controller 562 may also take into consideration any disturbances to the robot in determining the required pressure level. In an example, the robot may be subjected to a disturbance during performance of a particular phase of the task. For instance, the robot may be subjected to an impact with another object, a terrain may change causing the robot to slip, the terrain may change from a flat and smooth surface to a rough (e.g., sandy) surface, the ground may begin to slope up increasing the load on the legs of the robot, etc. The controller 562 may receive sensory information indicating that the robot has been subjected to such a disturbance. For the robot to recover from such a disturbance and return to performance of the task, the controller 562 may determine that a different pressure level is appropriate for the recovery.

If such a different pressure level is higher than a pressure level at which the hydraulic system operated prior to the disturbance, the controller 562 may command the pump 500 to increase pressure level of fluid in the accumulator 506. If the recovery pressure level is less than the pressure level at which the hydraulic system operated prior to the disturbance, the controller 562 may command the pump 500 to stop providing fluid to the accumulator 506. Additionally or alternatively, the controller may actuate the dump valve 566 to reduce the pressure level to a margin value above the recovery pressure level. Upon recovering from the disturbance, the controller may adjust operation of the hydraulic system to return back to the pressure level appropriate for the disturbed phase of the task.

Figure 7:
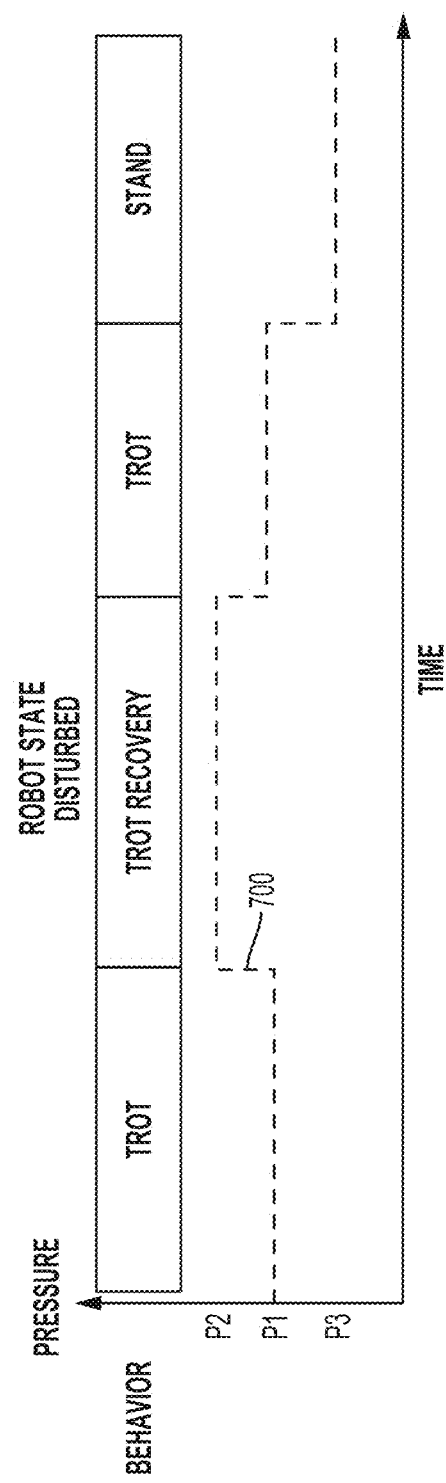
FIG. 7 illustrates pressure variation as a robot is subjected to a disturbance during performance of a task, in accordance with an example implementation.

FIG. 7 illustrates pressure variation as the robot is subjected to a disturbance during performance of a task, in accordance with an example implementation. Such pressure variation is illustrated by line 700. The task illustrated in FIG. 7 involves preplanned phases including a trotting period followed by a standing period. The trotting period requires a pressure P1. However, while trotting, the robot is subjected to a disturbance (e.g., an unanticipated force applied to the robot, the robot slips, a terrain changes from a smooth surface to a rough surface, etc.). The controller 562 may detect such a disturbance (e.g., a change in smoothness of the terrain) by way of sensors coupled to the robot, for example. In response to the disturbance, the controller 562 may increase pressure level from P1 to P2 for a "trot recovery" period that involves the robot restoring its balance. After the "trot recovery" period elapses and the robot restores its balance, the robot transitions back into trotting and the controller 562 thus commands the hydraulic system to reduce the pressure back to P1. Then, after the trotting portion of the task is performed, the robot transitions into a standing state and the controller 562 causes the pressure to be reduced further to P3.

Although the line 700 shows abrupt changes in pressure levels similar to variations illustrated by the line 600 in FIG. 6, the controller 562 may be configured to anticipate the disturbances by way of sensor inputs. The controller may thus be able to receive the information to adjust operation of the hydraulic system prior to occurrence of, and in anticipation of, the disturbance.

Particularly, the robot may include sensors (e.g., camera, LIDAR, RADAR, etc.) that provide the controller 562 with information related to an environment of the robot. For instance, based on perception sensor information, the controller 562 may determine that the robot is about to bump into an object or that an object is about to hit the robot on its side. In another example, the controller 562 may detect that a portion of a surface on which the robot is about to step is slippery or has a different smoothness level compared to a current portion of the surface. For instance, the controller 562 may identify, based on image information captured by an image-capture device coupled to the robot, an icy patch on the ground, or a change in a texture of the terrain. The term "about to" is used herein to indicate an event may occur within a given period of time such as 5 seconds, or a range such as 2-10 seconds. The controller 562 may take such environmental disturbances into consideration to determine an appropriate pressure level for the hydraulic system prior to occurrence of the disturbances. In this case, the controller 562 may vary the pressure in an anticipatory smooth manner similar to the variation represented by the line 602 in FIG. 6.

The controller 562 may take into consideration other factors in determining an appropriate pressure level. For example, the controller 562 may take into consideration a history of requested pressure. For instance, the controller 562 may keep track of pressure levels requested by the actuators of the robot within a predefined period of time in the past and determine the pressure level to command the hydraulic system to deliver accordingly. If recent pressure level requests indicate a high pressure level, the controller 562 may, in response, increase pressure level by pumping fluid in the accumulator 506. The controller 562 may assign a larger weight to more recent requests, while assigning a smaller weight to older pressure requests.

In another example, the controller 562 may determine that one or more of the actuators of the robot have been applying a force that requires a pressure level close to current pressure level of the fluid in the accumulator 506. In response, the controller 562 may increase the pressure level of fluid in the accumulator 506 to increase the margin or difference between the supply fluid pressure level and the required pressure to accommodate any unforeseen changes, for example.

In another example, the controller may take into consideration an anticipated gait of the robot to determine a pressure level that would be required over the next N seconds for instance. In still another example, the controller 562 may determine a likelihood of transition from a current behavior to another behavior based on a nature of the task of the robot or previous tasks completed by the robot. For instance, the robot may be about to lift an object, which may require a higher hydraulic pressure level. The controller 562 may then determine the pressure level that would be required to accommodate the change in behavior and command the hydraulic system to adjust its hydraulic pressure level in advance of the transition.

In an example, the controller 562 may determine a pressure envelop over time to accommodate a particular task or phase of the task. As an example, in a given phase of a task, the robot may jog for a period of time. During jogging, the actuator 410 may be subjected to cycles of extension and retraction to cause the robotic leg 400 to be lifted off the ground and then touch down on the ground, and so on. Thus, for instance, the controller 562 may command the hydraulic system of FIG. 5 (e.g., actuate the solenoid 544) to supply high pressure fluid to the chamber 520 to extend the piston 514 while allowing fluid to discharge from the chamber 522. The controller 562 may then command the hydraulic system to supply high pressure fluid to the chamber 522 to retract the piston 514, while allowing fluid to discharge from the chamber 520. The controller 562 may be aware that these cycles would continue for a period of time and may thus determine an envelope of pressure values to accommodate the pressure required to perform both the extension and the retraction. The robot then operates according to these pressure envelopes.

Figure 8:
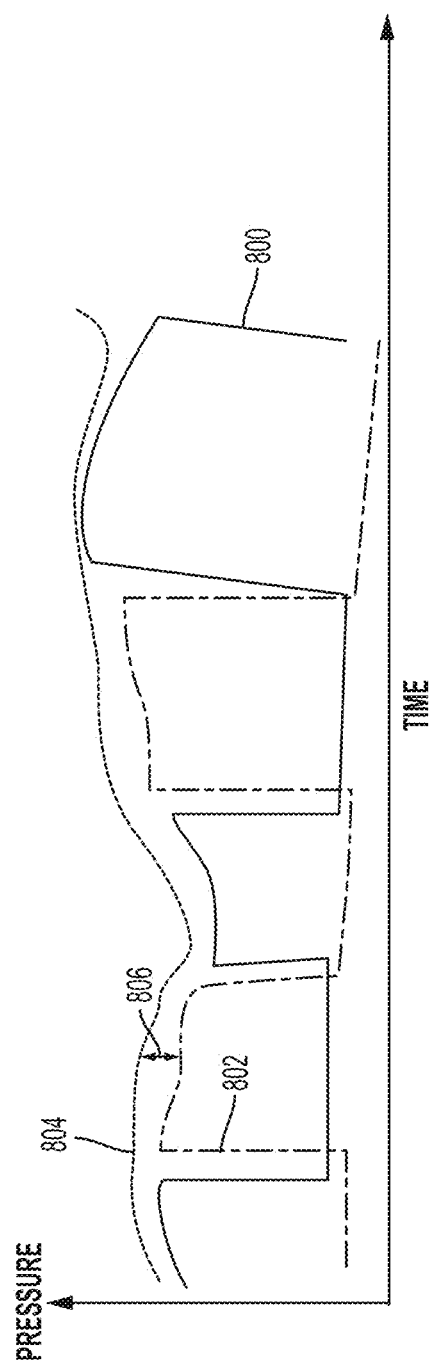
FIG. 8 illustrates a running pressure envelope, in accordance with an example implementation.

Particularly, FIG. 8 illustrates a running pressure envelope, in accordance with an example implementation. As shown in FIG. 8, lines 800 and 802 represents a pressure level required in the chambers 520 and 522 to effect the cycles of extension and retraction of the piston 514. When the line 800 is above the line 802, then the piston 514 is in an extension portion of a cycle, and when the line 802 is above the line 800, the piston 514 is in a retraction portion of the cycle. The controller 562 may be aware of these pressure variations based on the task being performed or to be performed by the robot. In response, the controller 562 may determine a running pressure envelop represented by line 804 that specifies a pressure level at which the accumulator 506 should provide fluid to the actuator 410.

Such pressure level should be higher than the requested pressure by a threshold pressure value as represented by pressure margin 806 in FIG. 8. The pressure margin 806 may vary over time, and the controller 562 determines the pressure margin 806 to be sufficiently large to accommodate losses in the hydraulic lines and metering losses across the valves. The pressure margin 806 may also vary based on commanded speed of the actuator 410. For example, the higher the commanded speed, the higher the amount of fluid flow required by the actuator 410. Further, the higher the amount of fluid flow, the higher the losses in the valves (e.g., the valve 510) and hydraulic lines, and vice versa. Thus, the controller 562 may adjust the margin 806 to accommodate a particular commanded speed.

III. Example Methods

Figure 9:
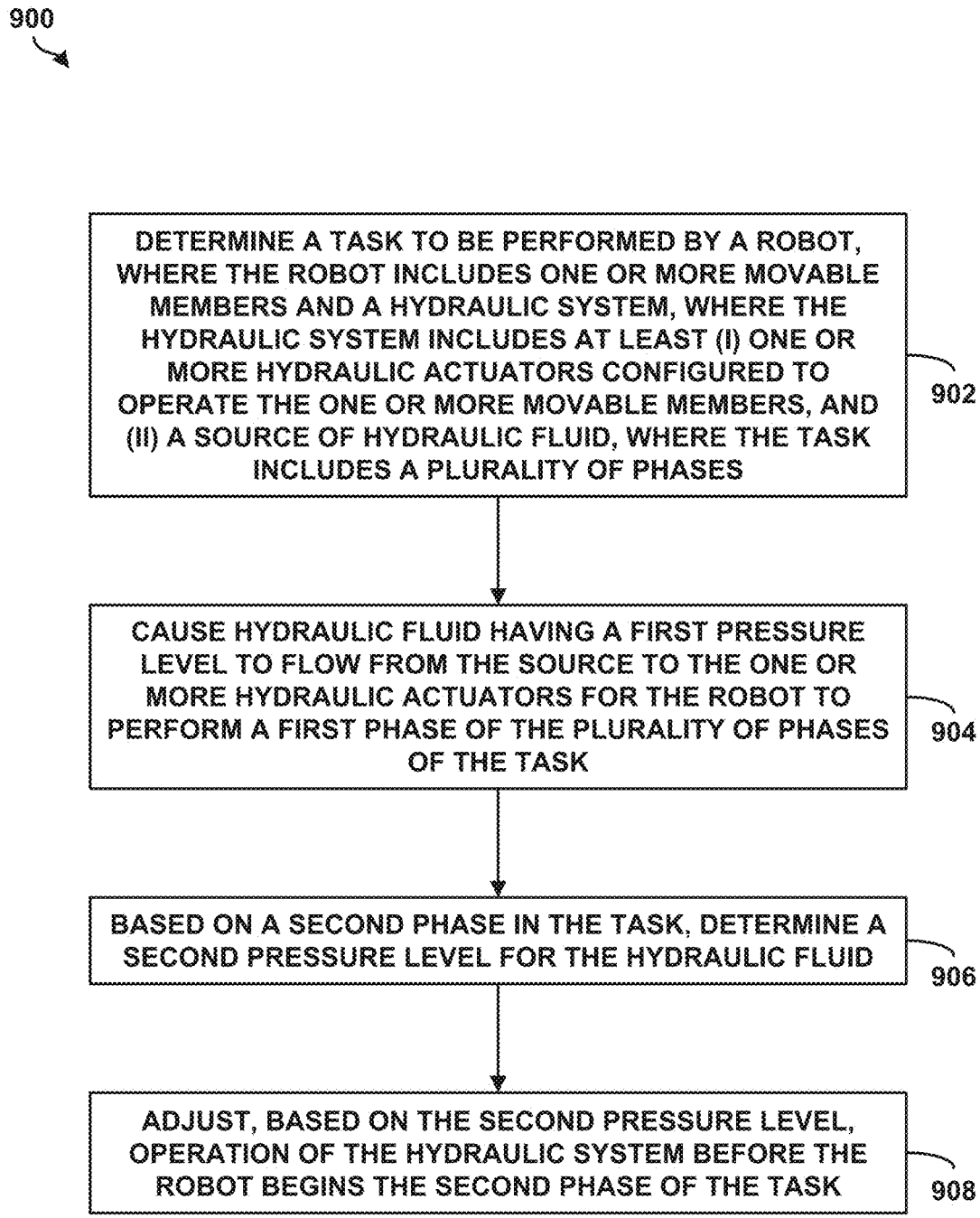
FIG. 9 is a flow chart of a method for controlling hydraulic pressure in a legged robot, in accordance with an example implementation.

FIG. 9 is a flow chart 900 for controlling hydraulic pressure in a legged robot, in accordance with an example implementation. The flow chart 900 may include one or more operations, or actions as illustrated by one or more of blocks 902-908. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the flow chart 900 and other processes and operations disclosed herein, the flow chart shows operation of one possible implementation of present examples. In this regard, each block may represent a module, a segment, or a portion of program code, which includes one or more instructions executable by a processor or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the flow chart 900 and other processes and operations disclosed herein, one or more blocks in FIG. 9 may represent circuitry or digital logic that is arranged to perform the specific logical operations in the process.

At block 902, the flow chart 900 includes determining a task to be performed by a robot. In line with the discussion above, the robot includes one or more movable members (e.g., the members 402 and 404) and a hydraulic system. The hydraulic system includes at least (i) one or more hydraulic actuators configured to operate the one or more movable members, and (ii) a source of hydraulic fluid. Further, the task includes a plurality of phases. In examples, some of these phases involve movement of at least some of the one or more movable members. The hydraulic system may also include a valve system that controls fluid flow to and from the actuators. The source may supply hydraulic fluid having a particular pressure level through the valve system to the actuators so as to cause the members of the robot to move.

Example tasks include moving from one place to another, carrying an object from one location to another, inserting an object in a particular space, etc. A task may include multiple phases. For example, to move from one location to another, the robot may begin by walking, then transition into trotting, and then transition into jogging, and slow down to stop at a target location. During each of these phases, the members of the robot may be subjected, or may apply, a different level of force that requires a respective different level of hydraulic fluid pressure.

The source of hydraulic fluid may be an accumulator such as the accumulator 506. A pump, such as the pump 500 may be configured to supply pressurized hydraulic fluid to the accumulator to vary pressure level of the hydraulic fluid in the accumulator.

At block 904, the flow chart 900 includes causing hydraulic fluid having a first pressure level to flow from the source to the one or more hydraulic actuators for the robot to perform a first phase of the plurality of phases of the task. A controller of the robot may actuate valves controlling fluid flow to and from the actuators. The controller may also command the source of hydraulic fluid to supply hydraulic fluid at a first pressure level appropriate to the first phase of the task. Hydraulic fluid thus flows through the valves to the actuators to cause the actuators to move to begin the first phase of the task. For instance, the first phase may involve walking for a period of time as described with respect to FIG. 6. Thus, the controller may command the hydraulic system to cause the actuators to move the legs and arms of the robot, causing the robot to walk.

At block 906, the flow chart 900 includes based on a second phase of the task, determining a second pressure level for the hydraulic fluid. As mentioned above with respect to FIG. 6, the controller may be aware (i.e., have task information) that the task involves multiple phases, and may also be aware of what a second phase involves, e.g., a trotting phase. The controller may then determine a second pressure level that is appropriate to the second phase. For example, the second phase may involve higher forces that require higher pressure levels. In another example, the terrain that the robot is operating on may change, thus requiring a change in the pressure level to accommodate such a change in the terrain. The controller may take such factors into consideration and determine a second pressure level that is appropriate to the second phase of the task.

At block 908, the flow chart 900 includes adjusting, based on the second pressure level, operation of the hydraulic system before the robot begins the second phase of the task. For example, as mentioned above, the source of pressurized hydraulic fluid may be an accumulator configured to store the hydraulic fluid. A pump may be configured to supply pressurized fluid to the accumulator and change the pressure level of fluid in the accumulator.

If the second pressure level is higher than the first pressure level, the controller may cause the pump to provide pressurized hydraulic fluid to the accumulator. Supplying pressurized fluid to the accumulator may continue until the hydraulic fluid in the accumulator has a pressure level within a threshold pressure value above the second pressure level. Having a pressure level at a margin or threshold pressure value above the second pressure level enables compensation for losses in the hydraulic system. Further, having the pressure level above the second pressure level by a margin may increase likelihood that hydraulic fluid flowing into the actuator(s) has at least a pressure level equal to the second pressure level.

In examples, in anticipation of a change in the required pressure level, the controller may cause the pump to start providing the pressurized fluid to the accumulator at a predefined period of time before the robot begins the second phase of the task. In this manner, the target pressure level may be reached over a period of time less than or equal to the predefined period of time.

In another example, the second pressure level may be less than the first pressure level. In this example, the controller may cause the pump to stop providing the hydraulic fluid to the accumulator at least until a pressure level of the hydraulic fluid in the accumulator is within a threshold pressure value from the second pressure level. The pressure of fluid in the accumulator may be decreased overtime due to leakage in the hydraulic system.

Additionally or alternatively, the hydraulic system may include a dump valve (e.g., the dump valve 566) hydraulically connected to the source and to a reservoir or tank (e.g., the reservoir 504). In response to determining the second pressure level is less than the first pressure level, the controller may actuate the dump valve. Actuating the dump valve causes a portion of the hydraulic fluid in the source to flow to the reservoir. The controller may actuate the dump valve until a pressure level of the hydraulic fluid of the source is within a threshold pressure value from the second pressure level. Thereafter, the controller may deactivate the dump valve to block flow therethrough.

In another example, the robot may be subjected to a disturbance during performance of a particular phase of the task. For instance, the controller may receive sensory information indicating that the robot has been subjected to such a disturbance. For the robot to recover from such a disturbance and return to performance of the task, the controller may determine that third pressure level is appropriate for the recovery.

If the third pressure level is higher than a pressure level at which the hydraulic system operated prior to the disturbance, the controller may command the pump to increase the pressure level of fluid in the accumulator. If the third pressure level is less than the pressure level at which the hydraulic system operated prior to the disturbance, the controller may command the pump to stop providing fluid to the accumulator. Additionally or alternatively, the controller may actuate a dump valve to reduce the pressure level to a margin value above the third pressure level. Upon recovering from the disturbance, the controller may adjust operation of the hydraulic system to return back to the pressure level appropriate for the phase that preceded the disturbance.

In another example, the sensors may be able to capture information indicative that such a disturbance is about to occur. The controller may receive the information and adjust operation of the hydraulic system prior to occurrence, and in anticipation, of the disturbance.

IV. Conclusion

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A method comprising:
    commanding, by a controller of a robot, the robot to perform a task, the robot comprising at least one movable member and a hydraulic system, the hydraulic system comprising at least one hydraulic actuator configured to operate the at least one movable member and a source of hydraulic fluid;
    determining, by the controller, an anticipated cyclic variation in hydraulic pressure required by the at least one hydraulic actuator over a period of time to perform the task;
    determining, by the controller, an anticipated pressure level envelope based on the anticipated cyclic variation in hydraulic pressure required by the at least one hydraulic actuator over the period of time to perform the task; and
    instructing, by the controller, the hydraulic system to cause hydraulic fluid having the anticipated pressure level envelope to flow from the source to the at least one hydraulic actuator over the period of time for the robot to perform the task.

2. The method of claim 1, wherein the anticipated pressure level envelope exceeds the anticipated cyclic variation in hydraulic pressure required by the at least one hydraulic actuator at any given point in time by a margin pressure value.

3. The method of claim 2, wherein a magnitude of the margin pressure value varies during the period of time to perform the task.

4. The method of claim 2, further comprising determining, by the controller, a magnitude of the margin pressure value based on a type of the task the robot is commanded to perform.

5. The method of claim 2, further comprising determining, by the controller, a magnitude of the margin pressure value based on a commanded speed of the robot during the period of time to perform the task.

6. The method of claim 5, wherein determining the magnitude of the margin pressure value comprises increasing the magnitude of the margin pressure value when the commanded speed of the robot increases.

7. The method of claim 1, wherein the at least one hydraulic actuator comprises a piston that divides an inside of the at least one hydraulic actuator into a first chamber and a second chamber, wherein determining the anticipated cyclic variation in hydraulic pressure required by the at least one hydraulic actuator is based on cycles of extension and retraction of the piston.

8. The method of claim 7, wherein the hydraulic system further comprises at least one hydraulic valve configured to control hydraulic fluid flow to and from the at least one hydraulic actuator for controlling motion of the piston.

9. The method of claim 7, wherein determining the anticipated cyclic variation in hydraulic pressure required by the at least one hydraulic actuator comprises:
    determining a first chamber cyclic variation in hydraulic pressure required by the first chamber of the at least one hydraulic actuator to effect the cycles of extension and retraction of the piston over the period of time for the robot to perform the task; and
    determining a second chamber cyclic variation in hydraulic pressure required by the second chamber of the at least one hydraulic actuator to effect the cycles of extension and retraction of the piston over the period of time for the robot to perform the task.

10. The method of claim 1, wherein the at least one movable member comprises two legs and the at least one hydraulic actuator comprises a first pair of hydraulic actuators configured to operate a first leg of the two legs and a second pair of hydraulic actuators configured to operate a second leg of the two legs.

11. The method of claim 1, wherein the at least one movable member comprises four legs and the at least one hydraulic actuator comprises a first pair of hydraulic actuators configured to operate a first leg of the four legs, a second pair of hydraulic actuators configured to operate a second leg of the four legs, a third pair of hydraulic actuators configured to operate a third leg of the four legs, and a fourth pair of hydraulic actuators configured to operate a fourth leg of the four legs.

12. A robot comprising:
   at least one movable member;
   a hydraulic system comprising:
      at least one hydraulic actuator configured to operate the at least one movable member; and
      a source of hydraulic fluid; and
   a controller configured to perform operations comprising:
      commanding the robot to perform a task;
      determining an anticipated cyclic variation in hydraulic pressure required by the at least one hydraulic actuator over a period of time to perform the task;
      determining an anticipated pressure level envelope based on the anticipated cyclic variation in hydraulic pressure required by the at least one hydraulic actuator over the period of time to perform the task; and
      instructing the hydraulic system to cause hydraulic fluid having the anticipated pressure level envelope to flow from the source to the at least one hydraulic actuator over the period of time for the robot to perform the task.

13. The robot of claim 12, wherein the anticipated pressure level envelope exceeds the anticipated cyclic variation in hydraulic pressure required by the at least one hydraulic actuator at any given point in time by a margin pressure value.

14. The robot of claim 13, wherein a magnitude of the margin pressure value varies during the period of time to perform the task.

15. The robot of claim 13, wherein the operations further comprise determining a magnitude of the margin pressure value based on a type of the task the robot is commanded to perform.

16. The robot of claim 13, wherein the operations further comprise a magnitude of the margin pressure value based on a commanded speed of the robot during the period of time to perform the task.

17. The robot of claim 16, wherein determining the magnitude of the margin pressure value comprises increasing the magnitude of the margin pressure value when the commanded speed of the robot increases.

18. The robot of claim 12, wherein the at least one hydraulic actuator comprises a piston that divides an inside of the at least one hydraulic actuator into a first chamber and a second chamber, wherein determining the anticipated cyclic variation in hydraulic pressure required by the at least one hydraulic actuator is based on cycles of extension and retraction of the piston.

19. The robot of claim 18, wherein the hydraulic system further comprises at least one hydraulic valve configured to control hydraulic fluid flow to and from the at least one hydraulic actuator for controlling motion of the piston.

20. The robot of claim 12, wherein the at least one movable member comprises two legs and the at least one hydraulic actuator comprises a first pair of hydraulic actuators configured to operate a first leg of the two legs and a second pair of hydraulic actuators configured to operate a second leg of the two legs.

21. The robot of claim 12, wherein the at least one movable member comprises four legs and the at least one hydraulic actuator comprises a first pair of hydraulic actuators configured to operate a first leg of the four legs, a second pair of hydraulic actuators configured to operate a second leg of the four legs, a third pair of hydraulic actuators configured to operate a third leg of the four legs, and a fourth pair of hydraulic actuators configured to operate a fourth leg of the four legs.

* * * * *